United States Patent [19]
Gillick et al.

[11] Patent Number: 5,526,463
[45] Date of Patent: *Jun. 11, 1996

[54] SYSTEM FOR PROCESSING A SUCCESSION OF UTTERANCES SPOKEN IN CONTINUOUS OR DISCRETE FORM

[75] Inventors: Laurence S. Gillick, Newton; Robert S. Roth, Newtonville, both of Mass.

[73] Assignee: Dragon Systems, Inc., Newton, Mass.

[ * ] Notice: The term of this patent shall not extend beyond the expiration date of Pat. No. 5,202,952.

[21] Appl. No.: 45,991

[22] Filed: Apr. 9, 1993

Related U.S. Application Data

[63] Continuation-in-part of Ser. No. 542,520, Jun. 22, 1990, Pat. No. 5,202,952.

[51] Int. Cl.$^6$ ............................................. G10L 9/00
[52] U.S. Cl. ........................................... 395/2.6; 395/2.4
[58] Field of Search ................... 381/41–43; 395/2.4, 395/2.5, 2.56, 2.61, 2.6, 2.59

[56] References Cited

U.S. PATENT DOCUMENTS

| | | | |
|---|---|---|---|
| 4,489,434 | 12/1984 | Moshier | 395/2.61 |
| 4,718,094 | 1/1988 | Bahl et al. | 381/43 |
| 4,720,863 | 1/1988 | Li et al. | 395/2.59 |
| 4,783,803 | 11/1988 | Baker et al. | 381/42 |
| 4,803,729 | 2/1989 | Baker | 381/43 |
| 4,805,218 | 2/1989 | Bamberg et al. | 381/43 |
| 4,805,219 | 2/1989 | Baker et al. | 381/43 |
| 4,829,576 | 5/1989 | Porter | 381/43 |
| 4,829,578 | 5/1989 | Roberts | 381/46 |
| 4,837,831 | 6/1989 | Gillick et al. | 381/43 |
| 4,903,305 | 2/1990 | Gillick et al. | 381/43 |
| 4,914,703 | 4/1990 | Gillick | 381/43 |
| 5,202,952 | 4/1993 | Gillick et al. | 395/2 |

FOREIGN PATENT DOCUMENTS

WO92/00585   1/1992   WIPO .

OTHER PUBLICATIONS

Bahl et al., "Obtaining Candidate Words by Polling in a Large Vocabulary Speech Recognition System," IEEE, Sep. 1988, pp. 489–492.

Bahl et al., "Matrix Fast Match: A Fast Method for Identifying a Short List of Candidate Words for Decoding," IEEE, Feb. 1989, pp. 345–347.

Bahl et al., "Constructing Groups of Accoustically Confusable Words," IEEE, Feb. 1990, pp. 85–88.

*Primary Examiner*—Allen R. MacDonald
*Assistant Examiner*—Michelle Doerrler
*Attorney, Agent, or Firm*—Thomas J. Engellenner; John V. Bianco; Lahive & Cockfield

[57] ABSTRACT

The system of the invention relates to continuous speech pre-filtering systems for use in discrete and continuous speech recognition computer systems. The speech to be recognized is converted from utterances to frame data sets, which frame data sets are smoothed to generate a smooth frame model over a predetermined number of frames. A resident vocabulary is stored within the computer as clusters of word models which are acoustically similar over a succession of frame periods. A cluster score is generated by the system, which score includes the likelihood of the smooth frames evaluated using a probability model for the cluster against which the smooth frame model is being compared. Cluster sets having cluster scores below a predetermined acoustic threshold are removed from further consideration. The remaining cluster sets are unpacked for determination of a word score for each unpacked word. These word scores are used to identify those words which are above a second predetermined threshold to define a word list which is sent to a recognizer for a more lengthy word match. Control means enable the system to initialize times corresponding to the frame start time for each frame data set, defining a sliding window.

27 Claims, 2 Drawing Sheets

SYSTEM FOR PROCESSING A SUCCESSION OF UTTERANCES SPOKEN IN CONTINUOUS OR DISCRETE FORM

REFERENCE TO RELATED PATENT APPLICATION

This application is a continuation-in-part of U.S. Patent application Ser. No. 542,520, entitled "Large-Vocabulary Continuous Speech Prefiltering and Processing System" (as amended), filed Jun. 22, 1990, corresponding to U.S. Pat. No. 5,202,952, Apr. 13, 1993, and assigned to the assignee of the present application.

BACKGROUND OF THE DISCLOSURE

While machines which recognize discrete, or isolated, words are well-known in the art, there is on-going research and development in constructing large vocabulary systems for recognizing continuous speech. Examples of discrete speech recognition systems are described in U.S. Pat. No. 4,783,803 (Baker et al., Nov. 8, 1988) and U.S. Pat. No. 4,837,831 (Gillick et al., Jun. 6, 1989), both of which are assigned to the assignee of the present application and are herein incorporated by reference. Generally, most speech recognition systems match an acoustic description of words, or parts of words, in a predetermined vocabulary against a representation of the acoustic signal generated by the utterance of the word to be recognized. One method for establishing the vocabulary is through the incorporation of a training process, by which a user "trains" the computer to identify a certain word having a specific acoustic segment.

A large number of calculations are required to identify a spoken word from a given large vocabulary in a speech recognition system. The number of calculations would effectively prevent real-time identification of spoken words in such a speech recognition system. Pre-filtering is one means of identifying a preliminary set of word models against which an acoustic model may be compared. Pre-filtering enables such a speech recognition system to identify spoken words in real-time.

Present pre-filtering systems used in certain prior art discrete word recognition systems rely upon identification of the beginning of a word. One example, as described in detail in U.S. Pat. No. 4,837,831, involves establishing an anchor for each utterance of each word, which anchor then forms the starting point of calculations. That patent discloses a system in which each vocabulary word is represented by a sequence of statistical node models. Each such node model is a multi-dimensional probability distribution, each dimension of which represents the probability distribution for the values of a given frame parameter if its associated frame belongs to the class of sounds represented by the node model. Each dimension of the probability distribution is represented by two statistics, an estimated expected value, or mu, and an estimated absolute deviation, or sigma. A method for deriving statistical models of a basic type is disclosed in U.S. Pat. No. 4,903,305 (Gillick et al., Feb. 20, 1990), which is assigned to the assignee of the present application and which is herein incorporated by reference.

U.S. Pat. No. 4,903,305 discloses dividing the nodes from many words into groups of nodes with similar statistical acoustic models, forming clusters, and calculating a statistical acoustic model for each such cluster. The model for a given cluster is then used in place of the individual node models from different words which have been grouped into that cluster, greatly reducing the number of models which have to be stored. One use of such cluster models is found in U.S. Pat. No. 4,837,831 (Gillick et al., Jun. 6, 1989), cited above. In that patent, the acoustic description of the utterance to be recognized includes a succession of acoustic descriptions, representing a sequence of sounds associated with that utterance. A succession of the acoustic representations from the utterance to be recognized are compared against the succession of acoustic models associated with each cluster model to produce a cluster likelihood score for each such cluster. These cluster models are "wordstart" models, that is, models which normally represent the initial portion of vocabulary words. The likelihood score produced for a given wordstart cluster model is used as an initial prefiltering score for each of its corresponding words. Extra steps are included which compare acoustic models from portions of each such word following that represented by its wordstart model against acoustic descriptions from the utterance to be recognized. Vocabulary words having the worst scoring wordstart models are pruned from further consideration before performing extra prefilter scoring steps. The comparison between the succession of acoustic descriptions associated with the utterance to be recognized and the succession of acoustic models in such cluster model are performed using linear time alignment. The acoustic description of the utterance to be recognized comprises a sequence of individual frames, each describing the utterance during a brief period of time, and a series of smoothed frames, each derived from a weighted average of a plurality of individual frames, is used in the comparison against the cluster model.

Other methods for reducing the size of a set against which utterances are to be identified by the system include pruning, and lexical retrieval. U.S. Pat. No. 4,837,831, cited above, discloses a method of prefiltering which compares a sequence of models from the speech to be recognized against corresponding sequences of models which are associated with the beginning of one or more vocabulary words. This method compensates for its use of linear time alignment by combining its prefilter score produced by linear time alignment with another prefilter score which is calculated in a manner that is forgiving of changes in speaking rate or improper insertion or deletion of speech sounds.

The statistical method of hidden Markov modeling, as incorporated into a continuous speech recognition system, is described in detail in U.S. Pat. No. 4,803,729 (Baker et al., Feb. 7, 1989), which is assigned to the assignee of this application, and which is herein incorporated by reference. In that patent, use of the hidden Markov model as a technique for determining which phonetic label should be associated with each frame is disclosed. That stochastic model, utilizing the Markov assumption, greatly reduces the amount of computation required to solve complex statistical probability equations such as are necessary for word recognition systems. Although the hidden Markov model increases the speed of such speech recognition systems, the problem remains in applying such a statistical method to continuous word recognition where the beginning of each word is contained in a continuous sequence of utterances.

Many discrete speech recognition systems use some form of a "dynamic programming" algorithm. Dynamic programming is an algorithm for implementing certain calculations to which a hidden Markov Model leads. In the context of speech recognition systems, dynamic programming performs calculations to determine the probabilities that a hidden Markov Model would assign to given data.

Typically, speech recognition systems using dynamic programming represent speech as a sequence of frames, each of which represents the speech during a brief period of time, e.g., fiftieth or hundredth of a second. Such systems normally model each vocabulary word with a sequence of node models which represent the sequence of different frames associated with that word. Roughly speaking, the effect of dynamic programming, at the time of recognition, is to slide, or expand and contract, an operating region, or window, relative to the frames of speech so as to align those frames with the node models of each vocabulary word to find a relatively optimal time alignment between those frames and those nodes. The dynamic programming in effect calculates the probability that a given sequence of frames matches a given word model as a function of how well each such frame matches the node model with which it has been time-aligned. The word model which has the highest probability score is selected as corresponding to the speech. Dynamic programming obtains relatively optimal time alignment between the speech to be recognized and the nodes of each word model, which compensates for the unavoidable differences in speaking rates which occur in different utterances of the same word. In addition, since dynamic programming scores words as a function of the fit between word models and the speech over many frames, it usually gives the correct word the best score, even if the word has been slightly misspoken or obscured by background sound. This is important, because humans often mispronounce words either by deleting or mispronouncing proper sounds, or by inserting sounds which do not belong. Even absent any background sound, there is an inherent variability to human speech which must be considered in a speech recognition system.

Dynamic programming requires a tremendous amount of computation. In order for it to find the optimal time alignment between a sequence of frames and a sequence of node models, it must compare most frames against a plurality of node models. One method of reducing the amount of computation required for dynamic programming is to use pruning. Pruning terminates the dynamic programming of a given portion of speech against a given word model if the partial probability score for that comparison drops below a given threshold. This greatly reduces computation, since the dynamic programming of a given portion of speech against most words produces poor dynamic programming scores rather quickly, enabling most words to be pruned after only a small percent of their comparison has been performed. Unfortunately, however, even with such pruning, the amount of computation required in large vocabulary systems of the type necessary to transcribe normal dictation.

Continuous speech computational requirements are even greater. In continuous speech, the type of which humans normally speak, words are run together, without pauses or other simple cues to indicate where one word ends and the next begins. When a mechanical speech recognition system attempts to recognize continuous speech, it initially has no way of identifying those portions of speech which correspond to individual words. Speakers of English apply a host of duration and coarticulation rules when combining phonemes into words and sentences, employing the same rules in recognizing spoken language. A speaker of English, given a phonemic spelling of an unfamiliar word from a dictionary, can pronounce the word recognizably or recognize the word when it is spoken. On the other hand, it is impossible to put together an "alphabet" of recorded phonemes which, when concatenated, will sound like natural English words. It comes as a surprise to most speakers, for example, to discover that the vowels in "will" and "kick", which are identical according to dictionary pronunciations, are as different in their spectral characteristics as the vowels in "not" and "nut", or that the vowel in "size" has more than twice the duration of the same vowel in "seismograph".

One approach to this problem of recognizing discrete words in continous speech is to treat each successive frame of the speech as the possible beginning of a new word, and to begin dynamic programming at each such frame against the start of each vocabulary word. However, this approach requires a tremendous amount of computation. A more efficient method used in the prior art begins dynamic programming against new words only at those frames for which the dynamic programming indicates that the speaking of a previous word has just ended. Although this latter method is a considerable improvement, there remains a need to further reduce computation by reducing the number of words against which dynamic programming is started when there is indication that a prior word has ended.

One such method of reducing the number of vocabulary words against which dynamic programming is started in continuous speech recognition associates a phonetic label with each frame of the speech to be recognized. The phonetic label identifies which ones of a plurality of phonetic frame models compares most closely to a given frame of speech. The system then divides the speech into segments of successive frames associated with a single phonetic label. For each given segment, the system takes the sequence of five phonetic labels associated with that segment plus the next four segments, and refers to a look-up table to find the set of vocabulary words which previously have been determined to have a reasonable probability of starting with that sequence of phonetic labels. As referred to above, this is known as a "wordstart cluster". The system then limits the words against which dynamic programming could start in the given segment to words in that cluster or set.

A method for handling continuous speech recognition is described in U.S. Pat. No. 4,805,219 (Baker et al., Feb. 14, 1989), which is assigned to the assignee of this application, and which is herein incorporated by reference. In that patent, both the speech to be recognized and a plurality of speech pattern models are time-aligned against a common time-aligning model. The resulting time-aligned speech model is then compared against each of the resulting time-aligned pattern models. The time-alignment against a common time-alignment model causes the comparisons between the speech model and each of the pattern models to compensate for variations in the rate at which the portion of speech is spoken, without requiring each portion of speech to be separately time-aligned against each pattern model.

One method of continuous speech recognition is described in U.S. Pat. No. 4,803,729, cited above. In that patent, once the speech to be recognized is converted into a sequence of acoustic frames, the next step consists of "smooth frame labelling". This smooth frame labelling method associates a phonetic frame label with each frame of the speech to be labelled as a function of: (1) the closeness with which the given frame compares to each of a plurality of the acoustic phonetic frame models; (2) an indication of which one or more of the phonetic frame models most probably correspond with the frames which precede and follow the given frame, and; (3) the transition probability which indicates for the phonetic models associated with those neighboring frames which phonetic models are most likely associated with the given frame.

Up to this time, no pre-filtering system has been implemented which provides the desired speed and accuracy in a large vocabulary continuous speech recognition system. Thus, there remains a need for an improved continuous speech recognition system which rapidly and accurately recognizes words contained in a sequence of continuous utterances.

It is thus an object of the present invention to provide a continuous speech pre-filtering system for use in a continuous speech recognition computer system.

SUMMARY OF THE INVENTION

The system of the present invention relates to discrete and continuous speech processing systems for use in large vocabulary discrete and continuous speech recognition systems.

Briefly, the system includes a stored vocabulary of word models. Utterances are temporally segmented, and at least two non-successive segments are processed with respect to the vocabulary. A subset of word models is generated from the stored vocabulary based on predetermined criteria. The subset of word models defines a list of candidate words which are represented by a signal generated by the system of the invention.

In one form, the system of the invention generates a succession of frame data sets which begin at a frame start time. Each of the frame data sets represents successive acoustic segments of utterances for a specified frame period. The frame data sets are each smoothed to generate a smooth frame data set, or smooth frame model, over a predetermined number of frames.

The system also includes a vocabulary, trained into the system by the user, which may be stored within the system as clusters. In the preferred embodiment of the invention, these clusters are wordstart clusters. Each cluster includes a plurality of word models which are acoustically similar over a succession of frame periods. Each word model includes nodes representing the probability distribution for the occurrence of a selected acoustic segment from that word model in a segment of the speech to be recognized.

The system generates a cluster score which represents the average negative-log likelihood of the smooth frames, from the previously identified smooth frame data set, evaluated using the probability model for the cluster against which the smooth frame model is being compared. Cluster sets having cluster scores above a predetermined acoustic threshold are removed from further consideration.

The cluster sets not removed from further consideration are then unpacked to identify the individual words from each identified cluster. At this point, the system generates a word score for each unpacked word resulting from the first filter. The word score represents the sum of the cluster score for the cluster from which the word was unpacked, and a language model score. This word score is used to identify those words which are below a second combined threshold to form a word list. The word list generated by the system of the invention is then sent to a recognizer for a more lengthy word match.

One important aspect of the invention is in a controller which enables the system to initialize times corresponding to the frame start time for each of a given frame data set. As a result of this controller, the system enables the identification of a preliminary list of candidate words for an utterance, discrete or continuous. In prior art discrete speech systems, such pre-filtering systems rely upon the occurrence of silence to mark the beginning of a spoken word. The system of the present invention is operative for both discrete and continuous speech, and generates a preliminary candidate word list, by pre-filtering at arbitrarily selected times, not necessarily for successive acoustic segments, and without identification of an anchor, such as silence.

BRIEF DESCRIPTION OF THE DRAWINGS

The foregoing and other objects of this invention, the various features thereof, as well as the invention itself, may be more fully understood from the following description, when read together with accompanying drawings in which.

DESCRIPTION OF THE PREFERRED EMBODIMENT

The preferred embodiment of the present invention is a computer system designed to recognize discrete and/or continuous speech input, in the form of utterances, by a user. The system may include a wide variety of computers and computer languages, provided that the computer includes the capacity to convert speech into digital signals, which signals may then be processed by the computer. A specific version of the invention which has already been tested by the inventor is run on a Compaq Deskpro 386 personal computer manufactured by the Compaq Computer Company of Houston, Tex., and is written in the C programming language.

Figure 1:
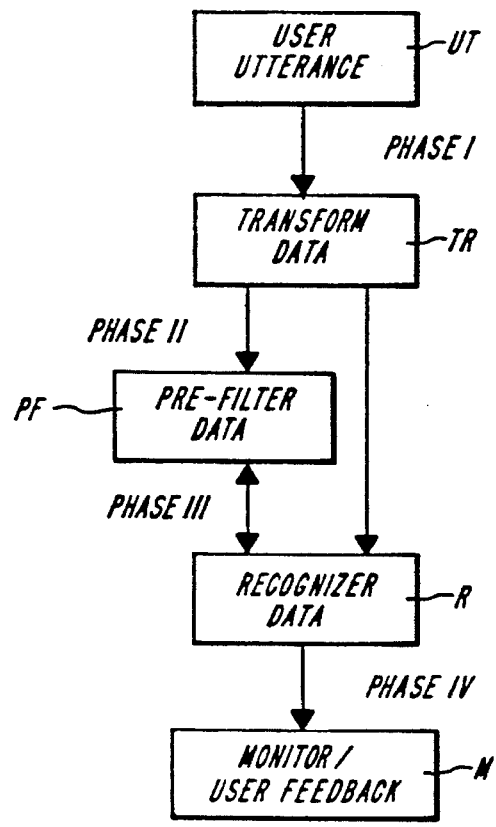
FIG. 1 is a schematic flow diagram of a preferred embodiment of a continuous speech recognition system according to the present invention.

FIG. 1 is a general flow diagram showing the flow of information or data of the present invention. As shown, Phase I involves the flow of data from the user, in the form of utterances UT, through a series of transformers into transform data TR. The transform data is concurrently sent to a recognizer R and a processing, or pre-filter system PF. While the recognizer R processes the transform data TR, it queries the pre-filter system PF for data. Phase II involves the flow of transform data TR to the pre-filter system PF. Phase III then involves data flow of pre-filter data to a recognizer R upon query by the recognizer R. User U receives recognizer data in the form of a monitor word display on a monitor M. Each phase will separately be discussed below. The system of the present invention is used during Phase II for converting transform data into pre-filter data which is then sent for more lengthy filtering at a recognizer (Phase III).

Phase I

Figure 2:
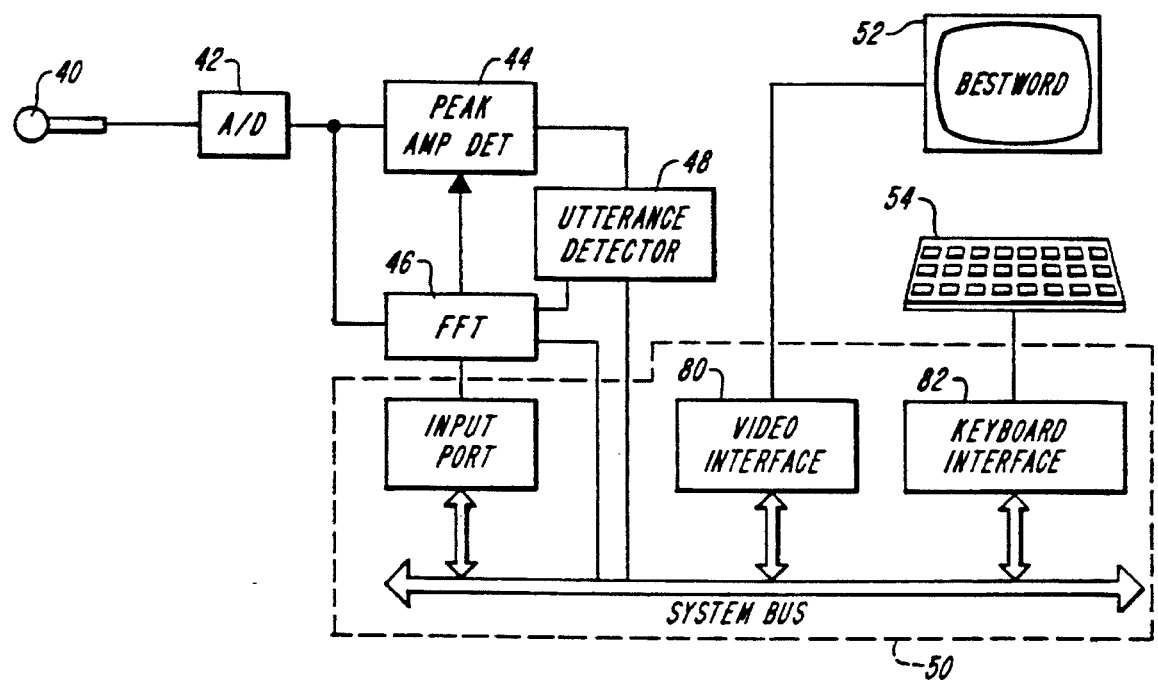
FIG. 2 is a schematic block diagram of the hardware used in a preferred embodiment of a continuous speech recognition system according to the present invention.

As shown in FIG. 2, the present system of the invention includes hardware for detecting utterances of spoken words by a user, and for converting the utterances into digital signals. The hardware for detecting utterances may include a microphone 40, which in the preferred embodiment is a head-mount microphone for easy user access. The hardware further includes an A/D converter 42, a peak amplitude detector 44, a fast-fourier-transform (or "FFT") 46, and an utterance detector 48. The signals produced by each of these devices are supplied to a programmable computer 50, such as a Compaq model '386 computer, or its equivalent. A monitor 52, keyboard 54, and the computer interfaces 80 and 82, respectively, are generally of the type commonly used with such personal computers.

The output of microphone 40 is connected to the input of the A/D converter 42. The A/D converter converts the analog signal produced by the microphone 40 into a sequence of digital values representing the amplitude of the signal produced by the microphone 40 at a sequence of evenly spaced times. For purposes of the present invention, it is sufficient if the A/D converter 42 is a codec chip giving 8-bit μ-law samples at a sample rate of 12000 hertz. These samples are converted to 14-bit signed linearized samples which are supplied to the inputs of the peak-amplitude detector 44 and the FFT 46.

FFT is well known in the art of digital signal processing. Such a transform converts a time domain signal, which is amplitude over time, into a frequency domain spectrum, which expresses the frequency content of the time domain signal. In the preferred embodiment, the FFT 46 converts the output of the A/D converter 42 into a sequence of frames, each of which indicates the spectrum of the signal supplied by the A/D converter in each of eight different frequency bands. In the preferred embodiment FFT 46 produces one such frame every fiftieth of a second.

The FFT 46 thus produces a vector of values corresponding to the energy amplitude in each of sixteen frequency bands. The FFT 46 converts each of these sixteen energy amplitude values into a sixteen-bit logarithmic value. This reduces subsequent computation since the sixteen-bit logarithmic values are more simple to perform calculations on than the longer linear energy amplitude values produced by the FFT, while representing the same dynamic range. Ways for improving logarithmic conversions are well known in the art, one of the simplest being use of a look-up table.

In addition, the FFT 46 modifies its output to simplify computations based on the amplitude of a given frame. This modification is made by deriving an average value of the logarithms of the amplitudes for all sixteen bands. This average value is then subtracted from each of a predetermined group of logarithms, representative of a predetermined group of frequencies. In the preferred embodiment, the predetermined group consists of the first seven logarithmic values, representing each of the first seven frequency bands.

Thus, utterances are converted from acoustic data to a sequence of vectors of k dimensions, each sequence of vectors identified as an acoustic frame. In the preferred embodiment, each frame represents 20 milliseconds of utterance, or duration, and k=8. Other devices, systems, and methods of transforming utterances received from a user into data upon which pre-filtering systems may act are contemplated as being within the scope of this invention.

Phase II

The primary function of a pre-filter system in a speech recognition system is reduction of the size of the vocabulary of words against which an utterance is compared. In a large vocabulary system, over 30,000 words may be contained in a predetermined vocabulary. The time required to test each acoustic segment of an utterance against each of those 30,000 words essentially prohibits real-time speech recognition. Thus, Phase II of the present invention involves the reduction of the vocabulary against which utterances are checked, in conjunction with reducing the number of acoustic segments which are checked against the vocabulary to correctly identify the spoken word. The resulting pre-filter data consists of a preliminary word list which, during Phase III, is involved in a more lengthy word match.

The prefiltering system of the present invention consists of a rapid match, similar to that described in U.S. Pat. No. 4,783,803. The purpose of the rapid match computation is to select, from a relatively large initial vocabulary, a smaller, originally active, vocabulary of words judged most likely to correspond to a given spoken utterance. Rapid match conserves computation by providing a preliminary word list upon which a more lengthy word match is performed. The preliminary word list only includes words which have a reasonable chance of corresponding to the given utterance, as determined by the rapid match system.

At any given time t, the system of the invention provides a short list of words that might begin at that time, based on analysis of the sequence of W frame vectors:

$$v_t, v_{t+1}, \ldots v_{t+w-1}$$

where w is the number of frames over which the system performs an evaluation, or the window width, and each v is a vector having k values for its associated frame. In the preferred embodiment, window width w=12. Although in the present embodiment the periods for each frame are the same, those values may differ in other embodiments.

From the sequence of frame vectors, the system generates s smooth frames $Y_1, \ldots Y_s$ which are based on the vectors in the window, each of which are determined in accordance with one of the following:

$$Y_1 = \sum_{i=0}^{b-1} a_i v_{t+i}$$

$$Y_2 = \sum_{i=0}^{b-1} a_i v_{t+c+i}$$

.
.
.

$$Y_s = \sum_{i=0}^{b-1} a_i v_{t+(s-1)c+i};$$

wherein the index b (e.g., b=4) is the smooth frame window width, coefficients $a_i$ are smoothing weights, and s is the number of smooth frames in the smooth frame data set (e.g., s=3). In the preferred embodiment, $a_i$ are positive, and all $a_i=1/b$ such that the sum of all $a_i=1$. In one aspect of the invention, the smooth frame window width may be expressed such that w=b+(s−1)c. In other aspects, window lengths may be variable. Variable c is the offset of each of said smooth frame windows which may be set so that current windows are either overlapping or non-overlapping. In the preferred embodiment of the invention, c=4, so that the current windows are non-overlapping. In other aspects, the offsets of successive windows may be variable.

Other systems of data reduction may be included, instead of smoothing. For example, the data may be reduced by fitting it to a predetermined model. The type of data reduction system used will depend upon the computer system, the form of data manipulated, and the desired speed of the system.

Figure 3:
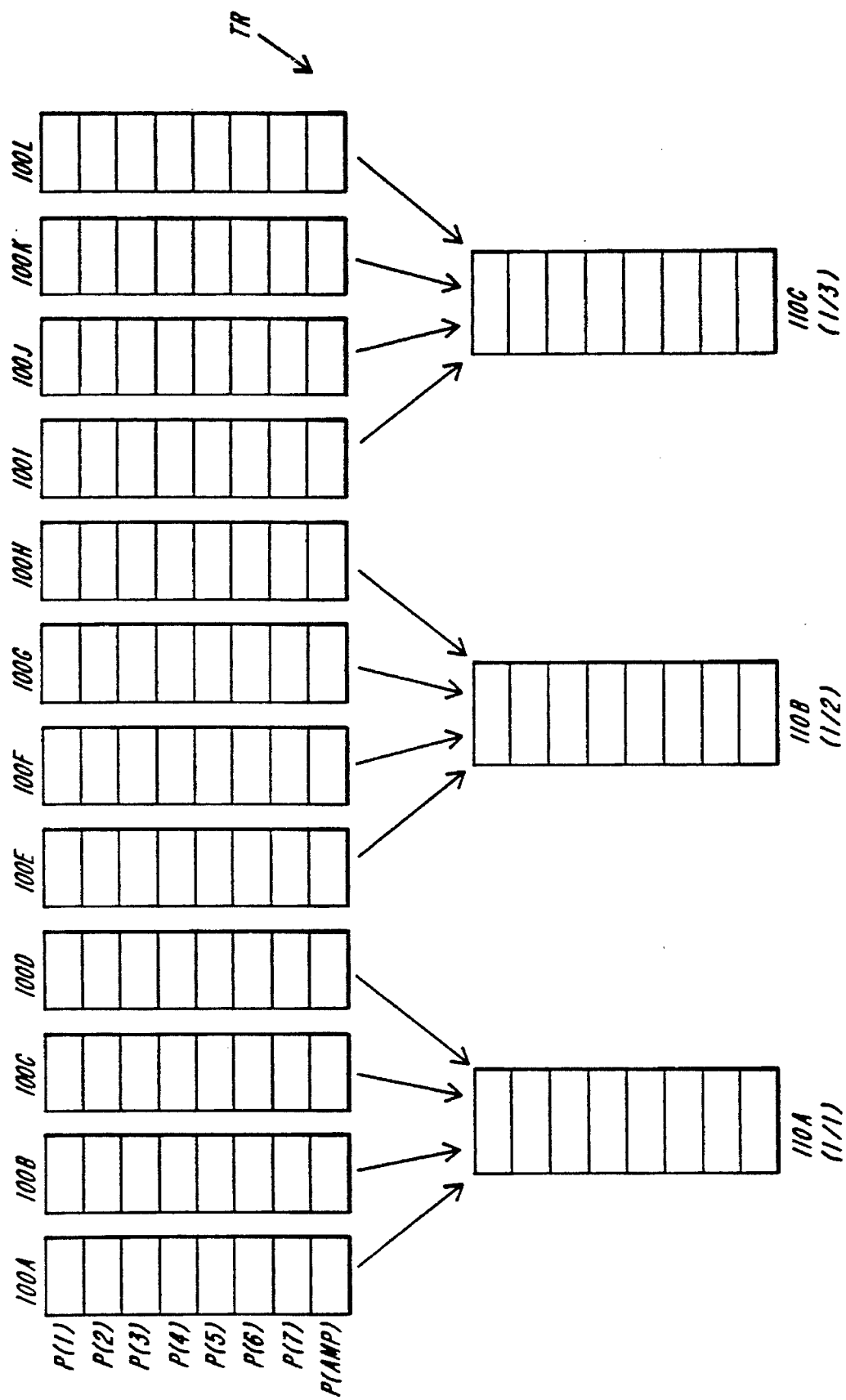
FIG. 3 is a schematic representation of the smooth frame system of the present invention.

In addition, and as schematically shown in FIG. 3, smooth frame data sets $Y_1$ (110A), $Y_2$ (110B) and $Y_3$ (110C) are established from frame vectors $V_0$ (100A), ... $V_{11}$ (100L), where w=12, b=4, $a_i=1$, S=3, and c=4, the frame vectors have dimension k and the smooth frame data sets have dimension j.

In the illustrated embodiment, j=k=8, but in other embodiments j may be less than k. The k values for each of the transform data TR are identified in FIG. 3 as parameters P(1) through P(AMP). The first seven parameters of each frame, parameters P(1)–P(7), represent the logarithm of the energy in their associated frequency band. The eighth parameter, P(AMP), corresponds to the logarithm of the total energy contained in all eight frequency bands used to calculate each frame.

In the illustrated embodiment, the eight parameters of each smooth frame 110 are calculated from the respective eight parameters of four individual frames 100. According to this process, four sequential frames 100 are averaged, to form one smooth frame 110. In the illustrated embodiment, individual frames 100A through 100D are averaged to form the smooth frame 110A, individual frames 100E through 100H are averaged to form the smooth frame 110B, and individual frames 100I through 100L are averaged to form the smooth frame 110C. Since each frame represents eight k parameters, each of the eight j parameters of the resulting smooth frames 110A–C has a value which corresponds to an average of the corresponding k parameters in each of the four individual frames, i.e. 110A–D, 100E–H, and 100I–L. The resultant smooth frames $Y_1$, $Y_2$, and $Y_3$, as so derived from utterances, are then evaluated against a vocabulary of stored word models as described in detail below.

A predetermined, or "trained", vocabulary of words resides in the system. The training of the system as to the vocabulary, and the manipulating of such words into word models is described in more detail in U.S. Pat. No. 4,837,831. To reduce the total number of words required to be stored in a system, and to reduce the number of individual words against which an utterance is to be matched, the word models for each word are grouped into a plurality of cluster sets, or clusters. In the preferred embodiment, these clusters are wordstart clusters, indicating that they are identified based on the beginning of each word.

The term "cluster" refers to a set in which a group of probabilistic models, such as the multiple smooth frame models described above, are divided into subgroups, or clusters, of relatively similar models. More specifically, it involves the set of acoustic probability distribution models which have associated therewith similar likelihoods of generating a predetermined acoustic description. A wordstart cluster of the illustrated embodiment consists of a collection of M acoustically similar words over the period of w frames from their beginnings, i.e. over the span of the window length.

For continuous speech, a word may appear in several different wordstart clusters, depending upon its speech context. For example, four word contexts may be demonstrated as:

silence—word—silence
 silence—word—speech
 speech—word—silence
 speech—word—speech Since the context of a spoken word may drastically influence the acoustics, wordstart clusters may include the same or different words in different speech contexts, yet still have acoustically similar descriptions. For discrete speech, only the silence—word—silence context is present.

Each wordstart cluster also consists of a sequence of acoustic models for smooth frames that might be generated from that wordstart cluster. In the preferred embodiment, a wordstart cluster is represented by r probability densities, or nodes, where $1 \leq r \leq s$: $f_1, f_2, \ldots f_r$. Each smooth frame model, $f_i$, being a distribution in k dimensional space.

To assess the evidence for whether the current sequence of smooth frames, $Y_1, \ldots, Y_s$, represents words in a particular wordstart cluster, a cluster score $S_y$ is computed for each sequence:

$$S_Y = 1/r \sum_{i=1}^{r} -\log f_i(Y_i)$$

This represents the average negative-log likelihood of the smooth frame models $f_i$ evaluated using the probability model r for the wordstart cluster against which the smooth frame model is being compared. The score $S_y$ will be computed for each of M wordstart clusters, $S_1, \ldots S_M$.

In the preferred embodiment, it is assumed that each probability density r is the product of k univariate probability densities. That is, it is assumed that the k elements of each Y are independent. Furthermore, it is assumed that each Y univariate density is a double exponential distribution, such that:

$$f(Y) = \prod_{j=1}^{k} (1/2\sigma j) \exp [|(Y^{(j)} - \mu_j)|/\sigma_j]$$

if $Y=(Y^{(1)}, Y^{(2)}, \ldots Y^{(k)})$. Thus, a particular $f_i$ in a wordstart cluster is specified by two k parameters: $\mu_1, \mu_2, \ldots \mu_k$, with $\mu$ representing mean values of that cluster; and k mean absolute deviations: $\sigma_1, \sigma_2, \ldots \sigma_k$.

The amount of computation required to identify wordstart clusters is reduced by having a typical smooth frame model, $f_{typ}$, appear in multiple different wordstart clusters. In that instance, the only computation required for a given Y and f is the negative-log probability: $-(\log f_{typ})(Y)$. This value only needs to be calculated once, and the outcome is then added into different wordstart cluster scores having frame $f_{typ}$.

Once smooth frame scores $S_{Yi}$, for $Y_1$ through $Y_M$, are computed for all M wordstart clusters in a vocabulary, all wordstart clusters having $S_Y$ greater than an absolute acoustic threshold value, $T_1$, are disregarded from further consideration by the system. Prior art systems have used a relative threshold to derive a set of words, the threshold being set relative to the best word. In the present system, an absolute threshold is set, independent of the best word. The threshold may be adjusted to accommodate the requirements of the recipient recognizer, to either reduce or increase the number of possible words upon which the recognizer must perform a more lengthy word match. For example, the clustering threshold may be set to produce the smallest number of clusters which provide a relatively high level of performance for the speech recognition method of the present invention.

Once the wordstart clusters to be disregarded are removed from consideration, the remaining wordstart clusters form the preliminary cluster set. Each wordstart cluster in the preliminary cluster set is then unpacked so that the individual words in each cluster may further be considered. For each word W from the unpacked wordstart clusters, the following score is derived:

$$S_W = S_Y + S_L$$

in which $S_W$ is the score for each unpacked word from each considered wordstart cluster, $S_Y$ is the wordstart cluster score for each cluster from which the unpacked words are derived, and $S_L$ is the language score.

The score for each unpacked word, $S_W$, is identified based on a variation of Bayes's Theorem which may be expressed as:

$$P(W_i|A) = [p(A|W_i)p(W_i)]/p(A)$$

wherein the terms represent the following: $p(W_i|A)$ represents the posterior probability of a word $W_i$, given the acoustics, or spoken word, A; $p(A|W_i)$ represents the probability of a spoken word, given a word $W_i$; $p(W_i)$ represents the probability of occurrence of a word $W_i$ based on the frequence of occurrence of the word in the language; and, $p(A)$ represents the probability of the ocurrence of the acoustics, A, in the utterance, averaged over all possible words. Each $W_i$ is identified for which $p(W_i|A)$ is biggest, which is equivalent to each $W_i$ for which $p(A|W_i)p(W_i)$ is biggest, which is equivalent to each $W_i$ for which log $[p(A|W_i)]+\log[p(W_i)]$ is biggest. This may finally be expressed as each $W_i$ for which the following is smallest:

$$S_{Wi} = -\log[p(A|W_i)] - K \log[p(W_i)]$$

wherein $-\log[p(A|Wi)]$ is representative of the acoustic model score, and $-K \log[p(Wi)]$ is representative of the language model score. The scale factor K is included to accommodate for the fact that each frame is not probabilistically independent. Thus, in the preferred embodiment a scale factor K is incorporated in order to correctly add language model score, $S_L$. In various forms of the invention, K may be preset based on empirical data, or K may be dynamically determined by way of an error rate feedback loop.

Once a score $S_{Wi}$ is derived for each word W in each of the unpacked preliminary clusters, it is compared against a combined threshold $T_2$. This threshold, similar to $T_1$, is empirically derived. Alternatively, it may be dynamically adjusted, and is dependent upon the trade-off between accuracy and speed. In the preferred embodiment, all words having a score $S_W$ which is less than the threshold $T_2$ are not further considered. That is, words having the best score, relative to the second threshold, become part of the word list sent to the recognizer for more lengthy consideration. This second threshold is set to produce the smallest feasible number of words, as determined either by the recognizer, the user, or the system designer. Obviously, the larger the word list, the slower will be the overall system, since a lengthy word match is performed for each word in the word list. On the other hand, if the word list is too small, the true match word may be omitted. In the preferred embodiment, for example, if the threshold $T_2$ is set such that the word list contains not more than $W_x$ words that begin at frame $f_t$, the system then identifies the best scoring $W_x$ words from the unpacked clusters. However, if there are fewer than $W_x$ words which meet the $T_2$ criteria, all words will be returned from the wordstart clusters meeting the $T_2$ threshold criteria.

An important aspect of the present invention is that at any time frame t, a word list may be derived by the system. Thus, in operation, the system may operate on a "sliding window" basis, deriving a word list for any predetermined g intervals. For example, for g=4, the system will identify a candidate word list for reporting to the recognizer at every fourth frame. This sliding window enables the system to recognize discrete words within a continuous utterance, since dynamic programming acts independent of the identification of an anchor.

Such lists can be returned at a set of arbitrary times (e.g., only once, every other frame, every frame). When it is known that only isolated words are being said in an output utterance, then it is known that the same process returns a list of candidate words that might start in a given frame. Words are always emerging out of "silence" and ending in "silence", so that the only model required for a word start group is one built for the silence/silence context in contrast to the above described continuous speech circumstances where there are four rapid match models for each word start group, corresponding to the words involved emerging from speech or silence and ending in speech or silence. For discrete speech, each rapid match model (model for a word start group) can have the same number of smooth nodes (if this is desired for efficiency in computation), since the later nodes can be taken to represent silence when the words themselves are short.

In the preferred embodiment, the system described above removes any duplicate words which may occur in the word list prior to sending the word list to the recognizer. Duplicates can occur, as explained above, since a given word may occur in several different wordstart clusters. This may be accomplished by any means well known and available to those skilled in the art. One example is by recognizing words from different clusters which have the same identification.

Using the system described above, pre-filter data PF is identified to be sent to a recognizer. The pre-filter data is essentially the result of the implementation of two filters: one for deriving a preliminary cluster data set of wordstart clusters satisfying a specified absolute threshold criteria; and, one for deriving a word list of words satisfying a specified combined threshold criteria. Thus, the pre-filter data comprises words upon which a more lengthy match may be performed.

Phase III

Once pre-filter data PF, in the form of a word list, is available from the system described above, a recognizer then performs a more lengthy word match to identify the single best word from the available word list which most closely matches the acoustic, or spoken, word. Continuous speech recognizers are described in detail in U.S. Pat. No. 4,783, 803, cited above. As in that patent, the speech recognition system of the preferred embodiment utilizes dynamic programming in performing the more intensive word matching.

In addition to dynamic programming, further processing may be performed during this phase. For example, a system for determining the feasibility of a selected word model, or endscores may be included. Other filtering systems may also be included during this phase.

Phase IV

This phase of the system involves reporting the candidate word model which has the highest probability of matching the utterance at a time t. In the preferred embodiment, reporting involves displaying the selected word on a monitor to be viewed by user who uttered the recognized speech. Standard monitors presently commercially available are all appropriate reporting devices.

The system may also include means for enabling a user to correct or modify the word selection of the system. This may include a menu showing a predetermined number of alternate selections for a given word or phrase. The system may include means for the user to actively edit the selected word or phrase, or otherwise manipulate the selected word or phrase identified by the system.

The invention may be embodied in other specific forms without departing from the spirit or essential characteristics thereof. The present embodiments are therefore to be considered in all respects as illustrative and not restrictive, the scope of the invention being indicated by the apppended claims rather than by the foregoing description, and all changes which come within the meaning and range of equivalency of the claims are therefore intended to be embraced therein.

What is claimed is:

1. A system for processing speech, said speech including a succession of utterances spoken in any of continuous and discrete form, comprising:

A. means for storing a plurality of word models;

B. means for identifying a succession of temporal segments of said utterances spoken in any of continuous and discrete form;

C. means selectively operable on ones of said segments for identifying a subset of said plurality of word models meeting predetermined criteria, said subset defining a list of candidate words;

D. control means for determining arbitrarily selected frame start times t during said utterances spoken in any of continuous and discrete form, said frame start times being independent of identification of an initial anchor; and E. means for generating a signal representative of said list of candidate words for selected ones of said frame start times t determined in step D.

2. A prefiltering system for processing speech, said speech including a succession of utterances spoken in any of continuous and discrete form, comprising:

A. cluster data storage means for storing a plurality of M cluster data sets, $C_1, \ldots, C_M$, where M is an integer greater than 1, each of said cluster data sets including data representative of a plurality of word models;

B. frame data means for generating a succession of w frame data sets $v_t, v_{t+1}, \ldots v_{t+w-1}$, beginning at a frame start time t during said succession of utterances spoken in any of continuous and discrete form, where w is an integer greater than 1, said succession of frame data sets being representative of a corresponding succession of temporal segments of said utterances spoken in any of continuous and discrete form, each of said frame data sets including k values representative of different frame parameters, where $k \geq 1$;

C. data reduction means selectively operable on said w frame data sets for generating s reduced frame data sets $Y_1, Y_2, \ldots, Y_3$, where s<w, each of said reduced frame data sets being related to an associated plurality of said frame data sets and including j values representative of different reduced frame data set parameters;

D. scoring means for evaluating each of said reduced frame data sets against succession of said cluster data sets to generate a cluster score $S_Y$ for each of said cluster data sets;

E. selectively operable identifying means for identifying each of said word models of said cluster data sets having a cluster score bearing a predetermined relation to at least one threshold score T, said identified word models defining a candidate word list;

F. control means for determining said frame start times t, where successive start times t are spaced apart arbitrarily, said frame start times being independent of identification of an initial anchor; and G. means for generating a signal representative of said candidate word list for preselected ones of said frame start times t determined by said control means.

3. A system according to claim 2 wherein said cluster data storage means and said frame data means are adapted whereby each of said frame data sets are associated with duration $D_1$, and wherein said cluster data sets are each associated with duration $D_2$, such that:

$D_1 \leq D_2$.

4. A system according to claim 2 wherein said cluster data storage means is adapted whereby said cluster data sets are wordstart cluster data sets.

5. A system according to claim 2 wherein said cluster data storage means is adapted whereby said word models of each of said cluster data sets correspond to acoustically similar utterances spoken in any of continuous and discrete form over a succession of no more than w frame data sets.

6. A system according to claim 2 wherein said data reduction means includes smooth frame means for processing said frame data sets whereby said reduced frame data sets are smoothed frame data sets.

7. A system according to claim 6 wherein said smooth frame means is adapted for determining smooth frame data sets in accordance with:

$$Y_1 = \sum_{i=0}^{b-1} a_i v_{t+i}$$

$$Y_2 = \sum_{i=0}^{b-1} a_i v_{t+c+i}$$

.
.
.

$$Y_s = \sum_{i=0}^{b-1} a_i v_{t+(s-1)c+i};$$

wherein $Y_1, Y_2 \ldots Y_s$ are said smooth frame data sets, and whereby each of said smooth frame data sets is associated with b of said frame data sets, and wherein said b are integers greater than 1, $a_i$ are predetermined weighting coefficients, and c defines an offset of each smooth frame data set with respect to the next previous smooth frame data set.

8. A system according to claim 7 wherein said data reduction means is adapted whereby w=b+(s-1)c.

9. A system according to claim 8 wherein said data reduction means is adapted whereby w=12.

10. A system according to claim 8 wherein said data reduction means is adapted whereby k=8.

11. A system according to claim 10 wherein said data reduction means is adapted whereby s=3.

12. A system according to claim 11 wherein said data reduction means is adapted whereby b=4.

13. A system according to claim 12 wherein said data reduction means is adapted whereby c=4.

14. A system according to claim 8 wherein w=12, k=8, s=3, b=4, c=4, and $a_i$=1/b.

15. A system according to claim 7 wherein said data reduction means is adapted whereby said weighting coefficients $a_i$=1/b.

16. A system according to claim 2 wherein said cluster data storage means is adapted whereby each of said word models includes r node data vectors $f_1, \ldots, f_r$, where $r \leq s$, each of said node data vectors being representative of a characteristic related to the occurrence of a selected one of acoustic segments from each word of a set of words associated with said cluster data sets in said acoustic segment of said utterances spoken in any of continuous and discrete form.

17. A system according to claim 16 wherein said cluster data storage means is adapted whereby said characteristic related to the occurrence of a selected one of acoustic segments comprises a probability distribution.

18. A system according to claim 17 wherein said cluster data storage means is adapted whereby said cluster score $S_Y$ corresponds to:

$$S_Y = (1/r) \sum_{i=1}^{r} -\log f_i(Y_i)$$

wherein $Y_i$ are ones of $Y_1, Y_2, \ldots, Y_s$, and r are said node data vectors $f_1, \ldots, f_r$ for corresponding ones of said word models.

19. A system according to claim 2 wherein said data reduction means is adapted whereby j=k.

20. A system according to claim 2 wherein said identifying means includes a first identifying means for identifying each of said cluster data sets having a cluster score measured with respect to a first predetermined threshold $T_1$, said identified cluster data sets defining preliminary cluster data sets.

21. A system according to claim 20 further comprising means for generating a word score representative of the sum of said cluster score $S_y$ of said cluster data set associated with each of said word models and a language model score $S_L$ and wherein said identifying means further comprises a selectively operable second identifying means for identifying each of said word models of each of said cluster data sets having a word score $S_W$ measured with respect to a second threshold $T_2$, said sum represented by:

$$S_W = S_Y + S_L.$$

22. A speech processing method for processing speech including a succession of utterances spoken in any of continuous and discrete form comprising the steps of:

A. storing a plurality of M cluster data sets, $C_1, \ldots, C_M$, where M is an integer greater than 1, each of said cluster data sets including data representative of a plurality of word models;

B. generating a succession of w frame data sets $v_t, v_{t+1}, \ldots v_{t+w-1}$, beginning at a frame start time t during said succession of utterances spoken in any of continuous and discrete form, where w is an integer greater than 1, each of said frame data sets being representative of successive acoustic segments of utterances spoken in any of continuous and discrete form for a frame period, each of said frame data sets including k values representative of different frame parameters where $k \geq 1$;

C. reducing w of said frame data sets to generate s reduced frame data sets, $Y_1, Y_2, \ldots, Y_3$ where s<w, each of said reduced frame data sets being related to an associated plurality of said frame data sets and including j values related to the k values of said associated frame data sets, where $j \leq k$;

D. evaluating said reduced frame data sets with a succession of said cluster data sets to generate a cluster score $S_Y$ for each of said cluster data sets;

E. identifying each of said word models having a cluster score bearing a predetermined relation to at least one threshold score T, said identified word models defining a word list;

F. determining said frame start times t, where successive start times t are identified at arbitrarily selected intervals; said frame start times being independent of identification of an initial anchor; and G. generating a signal representative of said candidate word list for selected ones of said frame start times determined in step F.

23. A method according to claim 22 wherein said reducing step C further Comprises the substep of smoothing said frame data sets.

24. A method according to claim 23 wherein said smoothing substep includes smoothing in accordance with:

$$Y_1 = \sum_{i=0}^{b-1} a_i v_{t+i}$$

$$Y_2 = \sum_{i=0}^{b-1} a_i v_{t+c+i}$$

$$\vdots$$

$$Y_s = \sum_{i=0}^{b-1} a_i v_{t+(s-1)c+i};$$

wherein $Y_1, Y_2, \ldots Y_s$ are said smooth frame data sets, and wherein said b are integers greater than 1, $a_i$ are predetermined weighting coefficients, and c defines an offset of each smooth frame data set with respect to the next previous smooth frame data set.

25. A method according to claim 24 wherein said smoothing substep includes setting w=12, k=8, s=3, b=4, c=4, and $a_i$=1/b.

26. A method according to claim 22 wherein said storing step includes the substep of generating for each of said word models, r node data vectors $f_1, \ldots, f_r$, where r is less than or equal to s, each of said node data vectors being representative of a characteristic related to the occurrence of a selected one of acoustic segments from each word of a set of words associated with said cluster data sets in said acoustic segment of said utterances spoken in any of continuous and discrete form, and wherein said evaluating step includes the substep of determining said cluster score $S_Y$ in accordance with:

$$S_Y = (1/r) S - \log_{i=1}^{r} f_i(Y_i)$$

wherein $Y_i$ are ones of $Y_1, Y_2, \ldots, Y_s$, and $f_i$ are said node data vectors $f_1, \ldots, f_r$ for corresponding ones of said word models.

27. A prefiltering method for processing speech, said speech including a succession of utterances spoken in any of continuous and discrete form, comprising the steps of:

A. storing a plurality of word models;

B. identifying a succession of temporal segments of said utterances spoken in any of continuous and discrete form;

C. operating on ones of said segments and selectively identifying a subset of said plurality of word models meeting predetermined criteria, said subset defining a list of candidate words;

D. determining arbitrarily selected frame start times t during said utterances spoken in any of continuous and discrete form, said frame start times being independent of identification of an initial anchor; and E. generating a signal representative of said list of candidate words for selected ones of said frame start times t determined in step D.

* * * * *